US010302489B2

United States Patent
Frank et al.

(10) Patent No.: US 10,302,489 B2
(45) Date of Patent: May 28, 2019

(54) METHOD FOR CALIBRATING A SPECTRORADIOMETER

(71) Applicant: INSTRUMENT SYSTEMS OPTISCHE MESSTECHNIK GMBH, Munich (DE)

(72) Inventors: Felix Frank, Munich (DE); Richard Young, Middlesex (GB); Juliane Kraft, Marxzell (DE); Reto Haring, Munich (DE)

(73) Assignee: INSTRUMENT SYSTEMS OPTISCHE MESSTECHNIK GMBH, Munich (DE)

(*) Notice: Subject to any disclaimer, the term of this patent is extended or adjusted under 35 U.S.C. 154(b) by 0 days.

(21) Appl. No.: 15/532,222

(22) PCT Filed: Dec. 1, 2015

(86) PCT No.: PCT/EP2015/078129
§ 371 (c)(1),
(2) Date: Jun. 28, 2017

(87) PCT Pub. No.: WO2016/087402
PCT Pub. Date: Jun. 9, 2016

(65) Prior Publication Data
US 2017/0336257 A1    Nov. 23, 2017

(30) Foreign Application Priority Data

Dec. 1, 2014  (DE) .................. 10 2014 117 595

(51) Int. Cl.
G01J 3/46    (2006.01)
G01J 3/10    (2006.01)
(Continued)

(52) U.S. Cl.
CPC . *G01J 3/10* (2013.01); *G01J 3/28* (2013.01); *G01J 3/505* (2013.01); *G01J 3/524* (2013.01); G01J 2003/2866 (2013.01)

(58) Field of Classification Search
CPC ........ G01J 3/00; G01J 3/02; G01J 3/10; G01J 3/20; G01J 3/28; G01J 3/50; G01J 3/52; G01J 3/44
See application file for complete search history.

(56) References Cited

U.S. PATENT DOCUMENTS

2009/0103081 A1* 4/2009 Whelan ..................... G01J 3/28
356/243.1
2010/0084544 A1* 4/2010 Tallavarjula .............. G01J 3/28
250/252.1
2012/0206714 A1* 8/2012 Higgins ................ G01J 3/0232
356/51

FOREIGN PATENT DOCUMENTS

DE    102008033544 A1    1/2010
EP        1314972 A1    5/2003
(Continued)

OTHER PUBLICATIONS

International Search Report of the International Searching Authority with English Translation issued in the corresponding PCT International Application No. PCT/EP2015/078129, dated Jul. 20, 2016 (9 pages).
(Continued)

Primary Examiner — Abdullahi Nur
(74) Attorney, Agent, or Firm — Raymond R. Ferrera; Adams and Reese LLP

(57) ABSTRACT

The invention relates to a method for calibrating a spectroradiometer (1), comprising the following method steps: capture of light measurement data by the measurement of (Continued)

Figure 1:
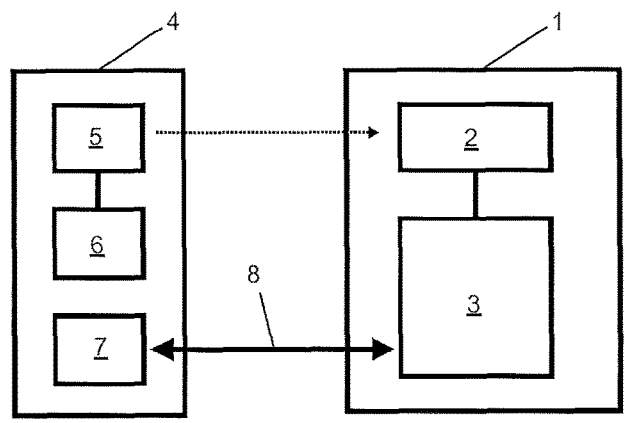

the radiation of at least one standard light source (4) using the spectroradiometer (1) that is to be calibrated; derivation of calibrated data from the light measurement data by the comparison of the captured light measurement data with known data of the standard light source (4); and calibration of the spectroradiometer (1) according to the calibration data. The aim of the invention is to provide a reliable and practical method for calibrating the spectroradiometer (1). In particular, the synchronism of spectroradiometers (1) situated in different locations (9, 10, 11) is to be produced simply and reliably. To achieve this aim, the validity, i.e. the usability, of the standard light source for the calibration is checked by a comparison of the light measurement data of the standard light source (4) with light measurement data of one or more additional standard light sources (4) of the same type, the validity of the standard light source (4) being established if the deviations of the light measurement data of the standard light sources (4) from one another lie below predefined limit values, and/or the standard light source (4) is measured using two or more standard spectroradiometers (1') of the same type or of different types, the validity of the standard light source (4) being established if the deviations of the light measurement data from one another, said data being captured using the different standard spectroradiometers (1'), lie below predefined limit values.

7 Claims, 2 Drawing Sheets

(51) Int. Cl.
*G01J 3/52* (2006.01)
*G01J 3/28* (2006.01)
*G01J 3/50* (2006.01)

(56) References Cited

FOREIGN PATENT DOCUMENTS

| EP | 1694049 | A1 | 8/2006 |
| JP | 2004177147 | A | 6/2004 |
| JP | 201481275 | A | 5/2014 |
| WO | 2000003213 | A1 | 1/2000 |
| WO | 2008137169 | A2 | 11/2008 |
| WO | 2014011729 | A1 | 1/2014 |
| WO | 2014123522 | A1 | 8/2014 |

OTHER PUBLICATIONS

Written Opinion of the International Search Authority (Form PCT/ISA/237) with English Translation issued in the corresponding PCT International Application No. PCT/EP2015/078129, dated Jul. 20, 2016 (15 pages).

International Preliminary Report on Patentability Chapter I issued in the corresponding PCT International Application No. PCT/EP2015/078129, dated Jun. 6, 2017 (9 pages).

Ein Leitfaden et al: "Grundlagen zur Norm ISO/IEC 17025 und deren Implementierung", Sep. 3, 2009, XP055264198, Gefunden im Internet: https://www.agilent.com/cs/library/primers/public/5990-4540DEE.pdf (64 pages).

* cited by examiner

METHOD FOR CALIBRATING A SPECTRORADIOMETER

The invention relates to a method for calibrating a spectroradiometer, comprising the following method steps:

recording light measurement data by measuring the radiation from at least one standard light source by means of the spectroradiometer to be calibrated, deriving calibration data from the light measurement data by comparing the recorded light measurement data with known data of the standard light source, and calibrating the spectroradiometer in accordance with the calibration data.

Spectroradiometers are appliances for measuring the spectrum of light sources, for example in the visible spectral range, with colorimetric and photometric variables being derived from the measured spectrum intensity distribution. Spectroradiometers are used for characterizing and calibrating light sources for very different applications. A spectroradiometer typically comprises an optical spectrometer for measuring the optical spectrum. Here, the spectrometer supplies digital measurement data in the form of the radiation intensity as a function of the wavelength. These measurement data are converted into colorimetric (e.g. color coordinates x, y, z) and/or photometric or radiometric (e.g. luminous flux) variables by means of a computer unit.

By way of example, spectroradiometers are used at production sites for light-emitting diodes for the purposes of measuring the light-emitting diodes in respect of their colorimetric and photometric variables and classifying these accordingly. Spectroradiometers are likewise used at production sites for displays (e.g. for LCD flat screens) for the purposes of measuring the brightness, the luminance, the color, etc. It is usual for many spectroradiometers to operate in parallel at such production sites. In order to ensure a uniform quality of the products, the synchronism of the spectroradiometers operating in parallel is of decisive importance. Here, synchronism means that the spectroradiometers operating in parallel supply substantially identical light measurement data (spectral intensity distribution, colorimetric and photometric values) for test objects which have an identical radiation spectrum. To this end, there is a need for regular calibration of the spectroradiometers. Here, a distinction is made between a fundamental calibration, which is carried out at comparatively large time intervals, and a calibration carried out more frequently, which may also be referred to as correction, with relatively small systematic measurement errors occurring on account of drifts being compensated within the scope of this correction.

WO 2014/011729 A1 has disclosed a method for calibrating color measuring appliances, i.e. for obtaining the synchronism of a plurality of color measuring appliances, in which the color measuring appliances to be calibrated are calibrated with a standardized color measuring appliance. To this end, a test item (typically a color pattern under well-defined illumination and observation geometry) is measured both by the color measuring appliances to be calibrated and by the standardized color measuring appliance. Calibration data are derived from the comparison of the light measurement data obtained thus, the color measuring appliances being calibrated on the basis of said calibration data.

The previously known method ensures the synchronism of the appliances used in parallel. However, a disadvantage is that the quality of the calibration depends crucially on a calibration of the standardized appliance. If the calibration of the standardized appliance is incorrect, this error is transferred to all appliances. A particular disadvantage is that the synchronism can only be ensured at one location, namely wherever the standardized appliance is situated. However, the production, e.g. of the light-emitting diodes or displays, is often distributed over a plurality of production locations, and so the synchronism of the appliances being used in parallel at the various production locations must also be ensured.

Against this backdrop, it is an object of the invention to provide a reliable and practical method for calibrating a spectroradiometer. In particular, the synchronism of spectroradiometers situated at various locations should be able to be established in a simple and reliable manner.

Proceeding from a method of the type set forth at the outset, the invention solves this problem by virtue of the validity, i.e. the usability, of the standard light source for the calibration being checked by virtue of the light measurement data of the standard light source being compared to the light measurement data of one or more further standard light sources of the same type, wherein the validity of the standard light source is determined if the deviations of the light measurement data of the standard light sources lie below predetermined thresholds, and/or the standard light source being measured by means of two or more standard spectroradiometers of the same type or of different types, wherein the validity of the standard light source is determined if the deviations of the light measurement data recorded by means of the various standard spectroradiometers from one another lie below predetermined thresholds.

Thus, according to the invention, a calibration standard is used for calibrating the spectroradiometer, said calibration standard comprising two or more appliances, namely, in one possible configuration, two or more (preferably three) standard light sources of the same type, the light measurement data of which is compared to one another in order thus to ensure a consistency check for determining the validity of the standard light source used for calibrating the spectroradiometer in each case. A change or premature aging of an individual appliance may therefore be reliably identified. If a deviation lying above a predetermined threshold is determined when comparing the light measurement data of the standard light sources, this means that one of the standard light sources has, in any case, experienced aging or any other change in the properties thereof, and so the standard light sources cannot be used for the calibration of the spectroradiometer; otherwise, the calibration of the respective spectroradiometer would be incorrect, in accordance with the changes of the standard light source. If the comparison of the light measurement data of the standard light sources yields a deviation above the predetermined threshold, it is first of all necessary to fundamentally recalibrate all standard light sources, where possible in such a way that the calibration can be traced to a national industrial standard. A spectroradiometer, or else a color measuring appliance, can be used for the consistency check, i.e. for comparing the light measurement data from the standard light sources. Alternatively, or in a complementary manner, the calibration standard used according to the invention may consist of a standard light source and two or more (preferably three) spectroradiometers (referred to here as standard spectroradiometer for the purposes of distinguishing these from the spectroradiometer to be calibrated). By means of the standard spectroradiometers, it is possible to determine whether the light measurement data of the standard light source correspond to the intended data, i.e. to the known data of the standard light source. Expressed differently, measuring the standard light source using the standard spectroradiometers determines whether the spectrum of the standard light source still corresponds to the calibration of the standard light source or whether the spectrum has changed. In this respect, a criterion for the validity of the standard light source is the correspondence of the light measurement data recorded by means of the standard spectroradiometers with the intended data of the standard light source. A further criterion is that the light measurement data recorded by the various standard spectroradiometers of the calibration standard substantially correspond, i.e. that the deviations of the light measurement data recorded by means of the various standard spectroradiometers from one another lie below predetermined thresholds. This once again realizes a consistency check in order to avoid that an incorrect calibration of a standard spectroradiometer used for checking the standard light source is transferred to the calibration of the spectroradiometer. If such a deviation is determined, the standard spectroradiometers, and optionally the standard light source as well, must be recalibrated, where possible with traceability to a national industrial standard.

An advantage of the method according to the invention is that this not only reliably ensures a synchronism of the spectroradiometers situated at one location but that it is also possible, in a simple and practical manner, to ensure the synchronism of many spectroradiometers situated at various locations by virtue of regularly recalibrating the calibration standards (a plurality of standard light sources, a plurality of standard spectroradiometers) situated at the respective location, or recalibrating these if deviations are determined, to be precise with traceability to a national industrial standard.

Hence, expressed differently, an essential aspect of the invention lies in the use of a local calibration standard for calibrating the spectroradiometers situated at the respective location, in combination with the calibration of the local calibration standards on the basis of a uniform, preferably national, industrial standard. As a result, the synchronism of all spectroradiometers situated at various locations is ensured.

In a preferred configuration of the method according to the invention, the standard light sources or the standard spectroradiometers of the calibration standard are calibrated on the basis of one or more industry-standard light sources, at the latest after expiry of a predetermined time interval. The calibration is carried out earlier if the consistency check described above yields deviations above the predetermined thresholds. By way of example, line lamps of a type known per se, such as e.g. argon lamps or mercury vapor lamps, or else lasers, such as e.g. helium-neon lasers, with spectral lines at known and well-defined wavelengths corresponding to the respective atomic transitions are suitable as industry-standard light sources for the calibration of the wavelength scale. Other light sources, e.g. halogen lamps, are suitable for the purposes of calibrating the spectral appliance sensitivity, said light sources having a known emission spectrum at defined operating parameters. The calibration of the spectral appliance sensitivity may be carried out on an absolute scale (e.g. lumen/nm) if the light source and the measurement arrangement are selected in a suitable manner to this end. A further option for realizing a calibration light source is offered by light-emitting diodes, with such light sources tending to be less suitable for a fundamental calibration as a result of the low luminosity in the edge regions of the visible spectrum. The employed industry-standard light sources are expediently tested at a national testing laboratory (e.g. the Physikalisch Technische Bundesanstalt (PTB) in Braunschweig in Germany) at regular intervals and recalibrated where necessary in order, in this way, to ensure the traceability to a national industrial standard. The aforementioned industry-standard light sources are particularly well-suited for carrying out the method according to the invention as these are readily transportable and may be used at the various locations in order, in each case, to calibrate the calibration standard there when necessary or at periodic intervals.

In order to ensure the synchronism of all spectroradiometers situated at different locations, the spectroradiometers situated at one location should, accordingly, be calibrated in the same way, i.e. using the same standard light sources or the same standard spectroradiometers, within the meaning of the invention.

Moreover, the local calibration standards, i.e. the standard light sources or the standard spectroradiometers, situated at different locations should be calibrated in the same way, i.e. on the basis of the same industry-standard light sources where possible. Accordingly, the synchronism of the spectroradiometers situated at one location is ensured, according to the invention, in the time between the calibrations carried out on the basis of the industry-standard light sources by using the local calibration standards. Deviations occurring during the calibration cycles are determined on account of the above-described consistency check, and so a new calibration may be initiated prematurely where necessary.

In accordance with a further aspect of the invention, a light-emitting diode that emits white light is used as a standard light source, said light-emitting diode comprising a semiconductor element emitting radiation in a first wavelength range and at least one phosphor which converts part of the radiation in the first wavelength range into radiation in a second wavelength range.

Light-emitting diodes that emit white light and have only a single semiconductor element, which emits in a first wavelength range, are known from the prior art. The first wavelength range usually lies in the blue spectral range. The blue radiation is partly converted into radiation of a second (third, fourth, etc.) wavelength range by means of one or more phosphors, with the mixed radiation made of the radiation in the first wavelength range and the radiation in the second (third, fourth, etc.) wavelength range yielding white light. By way of example, white light-emitting diodes, in which use is made of a semiconductor element emitting in the blue spectral range in combination with a phosphor emitting in the yellow spectral range, are known. Likewise, white light-emitting diodes, in which the semiconductor element emitting in the blue spectral range is combined with phosphors emitting in the green spectral range and red spectral range such that, once again, the resultant mixed light yields a white color impression, are known.

For use as a standard light source in accordance with the invention, the white light-emitting diode should be operated at a stabilized temperature and a stabilized current which flows through the semiconductor element. In this way, a well-defined and reproducible spectrum of the emitted light is ensured. Expediently, the standard light source comprises a regulating device which regulates the operating parameters of the light-emitting diode to constant values.

The use of a standard light source on the basis of a white light-emitting diode is advantageous in that a corresponding standard light source may be realized in a particularly compact, stable, transportable and cost-effective manner and with long recalibration cycles. The standard light source is universally usable on account of the white emission spectrum. The calibration is effective for the entire visible spectrum. Therefore, the calibration is valid for the photometric and colorimetric variables measured by means of the spectroradiometer.

In a preferred configuration of the method according to the invention, the calibration of the spectroradiometer comprises correcting the wavelength scale of the spectrometer of the respective spectroradiometer in such a way that the positions of spectral extrema of the measured spectrum substantially correlate with the positions of spectral extrema of the known spectrum of the standard light source. The spectrum of the white light-emitting diode has well-defined spectral extrema (in particular a pronounced maximum in the blue spectral range), and so the correction of the wavelength scale may be carried out reliably and with a high accuracy.

In a complementary manner, or alternatively, the calibration may comprise correcting the spectral sensitivity in a wavelength-dependent manner in such a way that the wavelength-dependent intensity curve of the corrected measured spectrum substantially correlates with that of the known spectrum of the standard light source. As mentioned above, the white light-emitting diode has a well-defined spectrum which can be used for reliable and accurate calibration of not only the wavelength scale but also the spectral sensitivity of the spectrometer of the respective spectroradiometer. Expediently, the wavelength scale is corrected in a first step and the spectral sensitivity is calibrated in a second step. After calibrating the wavelength scale, the spectral sensitivity can easily be calibrated by comparing the wavelength-dependent intensity curve of the measured spectrum with that of the known spectrum of the standard light source and by an appropriate wavelength-dependent correction. Alternatively, it is possible to determine parameters on the basis of a model, said parameters reproducing the intensity curve as accurately as possible. This is advantageous in that the noise contributions in the measurement signal can be eliminated and in that the model may be extrapolated into spectral regions in which no usable measurement results are present on account of a restricted emission spectrum of the standard light source.

Figure 2:
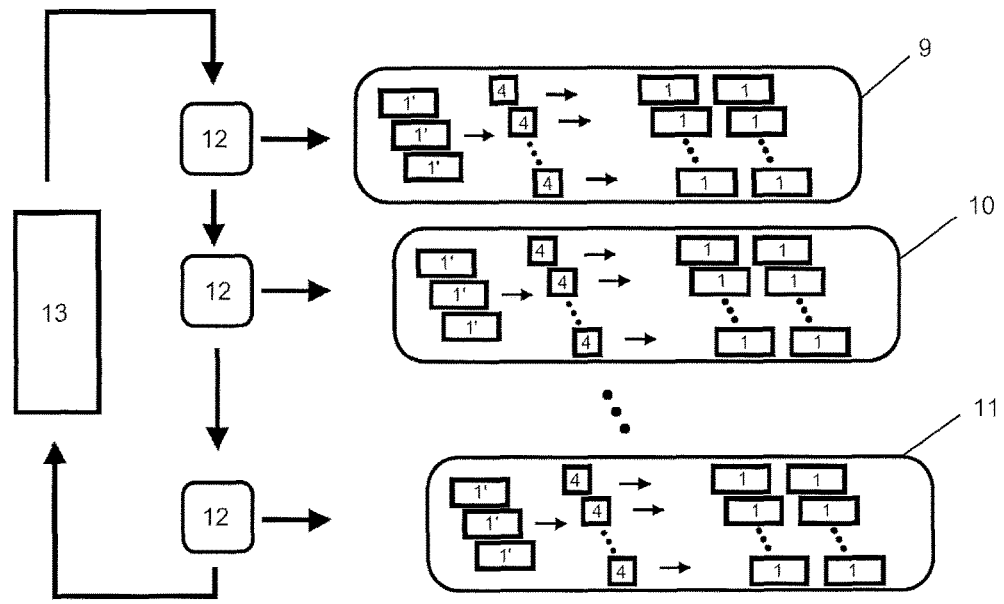
Figure 3:
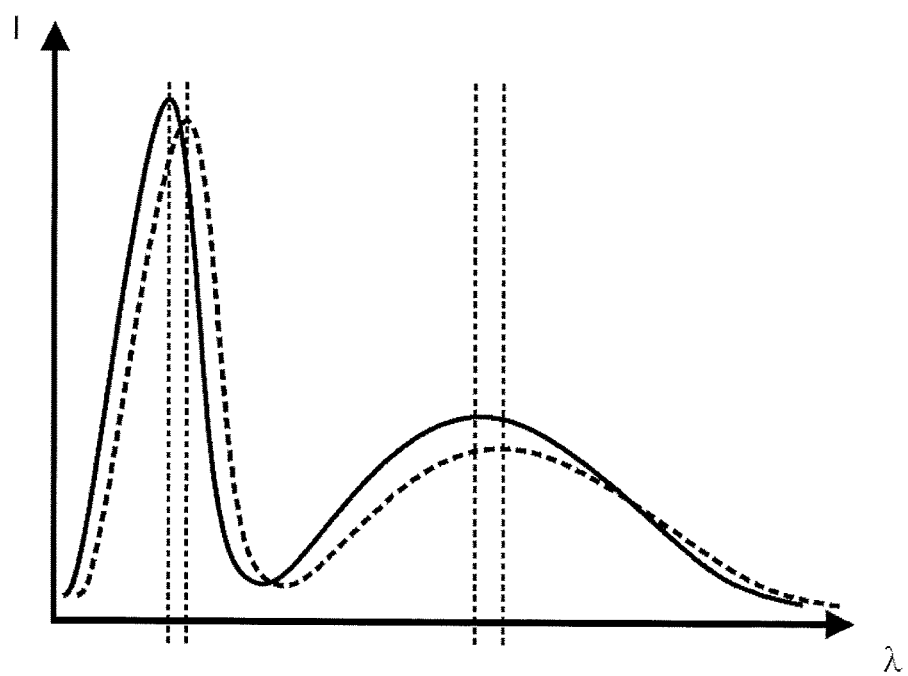
Figure 3:
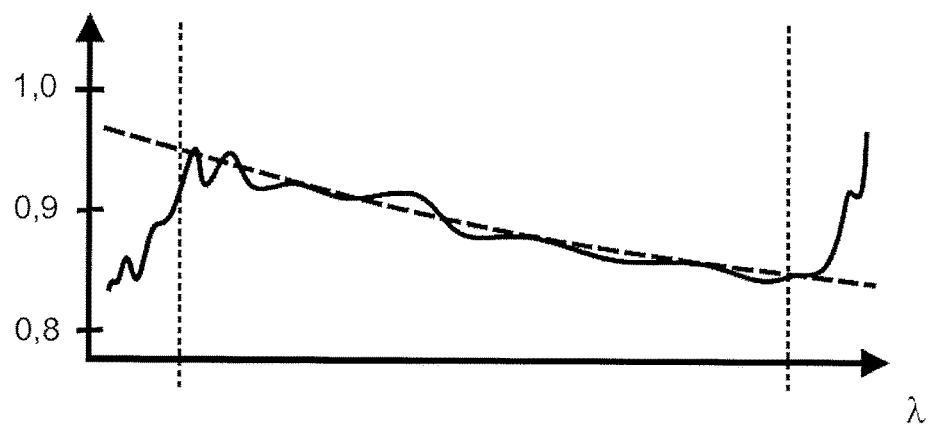

Exemplary embodiments of the invention are explained in more detail below on the basis of the drawings. In the figures:

FIG. 1: shows a schematic view of a spectroradiometer with a standard light source;

FIG. 2: shows an illustration of the method according to the invention as a block diagram; and FIG. 3: shows an illustration of the calibration on the basis of a white light-emitting diode as a standard light source.

FIG. 1 schematically shows a soectroradiometer 1, which comprises an optical spectrometer 2 and a computer unit 3 connected therewith. The optical spectrometer 2 measures the spectrum of a light source and supplies the wavelength-dependent intensity curve in digital form. These measurement data are transmitted to the computer unit 3. By way of example, the spectrometer 2 comprises a dispersive element (typically a grating), which spatially separates the spectral components of the measured radiation, and a CCD element comprising a multiplicity of light-sensitive pixels, with each pixel being assigned to a specific wavelength interval on account of the spatial arrangement. The computer unit 3 evaluates the spectrum which is present in digital form and calculates photometric and/or colorimetric variables therefrom, such as e.g. the color coordinates x, y, z.

According to the invention, a standard light source 4 is used for calibrating the spectroradiometer 1. Said standard light source comprises a light-emitting element 5, for example a light-emitting diode, which is connected to a regulating device 6. The regulating device 6 supplies the light-emitting element 5 with power and regulates the operating parameters thereof, such as current, voltage and temperature, to predetermined constant values. This ensures that the light-emitting element 5 has a well-defined, known emission spectrum.

In the depicted exemplary embodiment, the same light measurement data are recorded by means of the spectroradiometer 1 by virtue of measuring the radiation of the standard light source 4 for the purposes of the calibration. The standard light source 4 comprises a data memory 7, in which the known data of the standard light source 4 are stored, for example in the form of the emission spectrum and/or photometric and/or colorimetric data. The spectroradiometer 1 reads these data by way of a data connection 8. The computer unit 3 compares the recorded light measurement data with the read known data from the standard light source 4 and derives calibration data therefrom. Finally, the spectroradiometer 1 is calibrated in accordance with the calibration data. Here, the calibration is carried out by means of suitable correction algorithms which re applied to the light measurement data by the computer unit 3. By way of example, it is possible to directly correct the photometric or colorimetric end results (e.g. the color coordinates). If the comparison of the light measurement data recorded from the standard light source 4 with the known data of the standard light source 4 e.g. yields a deviation of a color coordinate by a difference value, the correction algorithm changes this color coordinate in accordance with the difference value during subsequent measurements. A corresponding statement applies to the photometric variables, such as e.g. the luminous flux, the luminance, etc. Alternatively, the measured spectrum may be corrected, i.e. before the photometric and/or colorimetric variables are derived from the spectrum. To this end, it is possible for there to be a wavelength-dependent application of a correction of the wavelength scale and a correction of the spectral sensitivity. This is explained in more detail below with reference to FIG. 3.

FIG. 2 illustrates the method according to the invention for calibrating a multiplicity of spectroradiometers 1, which are situated at various, i.e. spaced apart, locations 9, 10, 11. By way of example, the locations 9, 10, 11 may be production locations of light-emitting diodes or displays. A local calibration standard is respectively used at each one of the locations 9, 10, 11, said local calibration standard comprising three standard spectroradiometers 1' and a multiplicity of standard light sources 4. As described above with reference to FIG. 1, each of the spectroradiometers 1 is calibrated using one of the standard light sources 4. Prior to the calibration of the spectroradiometers 1, the validity, i.e. the usability, of the standard light source 4 for the calibration is checked in each case by virtue of each standard light source 4 being measured by means of the three standard spectroradiometers 1' situated at the respective location 9, 10, 11, with the validity of the relevant standard light source 4 being determined if the deviations of the light measurement data from one another, recorded by way of this consistency check, lie below predetermined thresholds. Moreover, a precondition for determining the validity of the standard light source 4 is that the light measurement data recorded by means of the standard spectroradiometers 1' deviate from the intended data, i.e. from the known data of the respective standard light source 4, by less than predetermined thresholds. Typically, the admissible deviations are less than 5%, preferably less than 1% of the intended value. Checking the validity on the basis of the respective three standard spectroradiometers 1' at each location 9, 10, 11 ensures that the basis of the calibration, provided by the standard spectroradiometers 1', is correct. If the consistency check yields a deviation, it is possible to deduce that one of the spectroradiometers 1' no longer operates in a reliable manner. The determined deviation is used as an opportunity to recalibrate all standard spectroradiometers 1' of the respective local calibration standard. Here, the use of at least three standard spectroradiometers 1' is advantageous in that the deviations determined during the consistency check allow indications to be provided in respect of which of the standard spectroradiometers 1' is affected. Hence, the process may be continued temporarily with the two non-affected standard spectroradiometers 1'. The standard spectroradiometers 1' may be of the same type, i.e. the same build, or of different types. The use of standard spectroradiometers 1' of different types is advantageous in that it is also possible to recognize and eliminate systematic deviations (e.g. on account of varying temperature or humidity) since appliances of different types react differently to changes in the ambient conditions in each case.

Standard spectroradiometers 1' are fundamentally recalibrated on the basis of an industry-standard light source 12 when deviations are determined, but at the latest after the expiry of a predetermined time interval. As described above, the industry-standard light source 12 may be a line lamp or a set of a plurality of line lamps in combination with one or more halogen lamps with a well-defined emission spectrum. The calibration of the standard spectroradiometers 1' situated at the various locations 9, 10, 11 is carried out in the same manner, i.e. on the basis of the same industry-standard light sources 12, which, to this end, are transported from location to location 9, 10, 11. The emission spectrum of the halogen-lamp-based industry-standard light source 12 is cyclically verified or calibrated in a certified laboratory 13, for example in a national testing laboratory. The line lamps do not require any calibration as they are defined in an unchanging manner by the nature of the atomic transitions and as they have unrestricted validity as a physical standard. This ensures the traceability of the calibration of all spectroradiometers 1 to a uniform (national) standard. As a result of combining the local calibration standards with the industry-standard light source 12 serving as a transfer standard according to the invention, the synchronism of all spectroradiometers 1 at the various locations 9, 10, 11 is ensured.

According to the invention, the standard light source 4 may have a white-light-emitting light-emitting diode as a light-emitting element 5, said light-emitting diode comprising a semiconductor element emitting radiation in a first wavelength range (e.g. in the blue spectral range) and at least one phosphor which converts part of the radiation in the first wavelength range into radiation in a second wavelength range (e.g. in the green/red spectral range). The upper diagram in FIG. 3 schematically shows the emission spectrum of such a light-emitting diode in the form of the wavelength-dependent intensity $I(\lambda)$. The solid curve shows the actual emission spectrum of the white light-emitting diode. It is possible to recognize an extremum in the blue spectral range (left) and a broader extremum in the green/red spectral range (right). The dashed curve reproduces the spectrum measured by means of the spectroradiometer 1 to be calibrated. It is possible to recognize that the extrema are displaced relative to one another (indicated by the vertical dashed lines in the upper diagram). Moreover, the relative intensities of the extrema are displaced in relation to the actual emission spectrum. This indicates that the spectrometer 2 of the spectroradiometer 1 requires a correction, i.e. a calibration, in respect of the wavelength scale and also in respect of the sensitivity. To this end, the computer unit 3 of the spectroradiometer 1 applies a correction algorithm which, in a first step, carries out a correction of the wavelength scale of the spectroradiometer 1 in such a way that the positions of the spectral extrema of the measured spectrum correlate with the positions of the spectral extrema of the known spectrum of the standard light source 4. By way of example, use can be made of linear scaling which brings about displacement and an expansion/compression of the wavelength scale. There is a wavelength-dependent correction of the spectral sensitivity in a second step. To this end, the measured spectrum, i.e. the wavelength-dependent intensity curve, is divided by the known wavelength-dependent intensity curve of the standard light source 4. The result is indicated in the lower diagram of FIG. 3 (solid curve). Noise caused by the measurement may be amplified in an unwanted manner in the result of the division. In order to compensate this, a suitable curve (e.g. a polynomial) is fitted to the curve emerging from the division (dashed curve in the lower diagram of FIG. 3). During said fitting, only the values within the interval indicated by the two vertical dashed lines in the lower diagram are taken into account. The values are not usable at the edge of the spectrum lying outside of this interval on account of the low intensity of the measured spectrum. Finally, the correction algorithm corrects the measured spectrum in accordance with the fitted curve which, in the process, is extrapolated over the entire relevant spectral range. The correction algorithm applied in this manner is valid over the entire spectral range. Accordingly, the results, i.e. the photometric and/or colorimetric variables which are determined by means of the computer unit 3 after applying the correction algorithm, are also automatically corrected correctly.

The invention claimed is:

1. A method for calibrating a spectroradiometer, comprising the following method steps:
    recording light measurement data by measuring the radiation from at least one standard light source by means of the spectroradiometer to be calibrated,
    deriving calibration data from the light measurement data by comparing the recorded light measurement data with known data of the standard light source, and calibrating the spectroradiometer in accordance with the calibration data,
    calibrating the standard light source on the basis of one or more industry-standard light sources, at the latest after expiry of a predetermined time interval,
    wherein the validity of the standard light source for the calibration is checked by the light measurement data of the standard light source being compared to the light measurement data of one or more further standard light sources of the same type, and the validity of the standard light source is determined if the deviations of the light measurement data of the standard light sources from one another lie below predetermined thresholds,
    and wherein otherwise the standard light source is calibrated earlier on the basis of one or more industry-standard light sources before expiry of the predetermined time interval.

2. The method as claimed in claim 1, wherein a plurality of spectroradiometers situated at one location are calibrated in the same way using the same standard light sources.

3. The method as claimed in claim 2, wherein standard light sources or standard spectroradiometers situated at different locations are calibrated in the same way on the basis of the same industry-standard light sources.

4. A method for calibrating a spectroradiometer comprising the following method steps:
  recording light measurement data by measuring the radiation from at least one standard light source by means of the spectroradiometer to be calibrated,
  deriving calibration data from the light measurement data by comparing the recorded light measurement data with known data of the standard light source, and
  calibrating the spectroradiometer in accordance with the calibration data, wherein the standard light source comprises a light-emitting diode that emits white light, said light-emitting diode comprising a semiconductor element emitting radiation in a first wavelength range and at least one phosphor which converts part of the radiation in the first wavelength range into radiation in a second wavelength range.

5. The method as claimed in claim 4, wherein the calibration comprises correcting the wavelength scale of the spectroradiometer in such a way that the positions of spectral extrema of the measured spectrum substantially correlate with the positions of spectral extrema of the known spectrum of the standard light source.

6. The method as claimed in claim 4, wherein the calibration comprises correcting the spectral sensitivity in a wavelength-dependent manner in such a way that the wavelength-dependent intensity curve of the corrected measured spectrum substantially correlates with that of the known spectrum of the standard light source.

7. The method as claimed in claim 4, wherein the standard light source comprises a regulating device which regulates the operating parameters of the light-emitting diode, in particular the current flow through the semiconductor element and the temperature of the semiconductor element.

* * * * *